United States Patent [19]
Ghenic

[11] Patent Number: 4,982,657
[45] Date of Patent: Jan. 8, 1991

[54] HOT DOG ROASTER

[76] Inventor: George Ghenic, 1760 Culver, Dearborn, Mich. 48124

[21] Appl. No.: 535,478

[22] Filed: Jun. 11, 1990

[51] Int. Cl.$^5$ .............................................. A47J 37/04
[52] U.S. Cl. .................................... 99/421 A; 99/419; 99/421 H
[58] Field of Search ...................... 99/419, 420, 421 R, 99/421 A, 421 H, 421 HH, 421 HV, 421 V, 421 M, 421 P, 421 TP; D7/381, 383, 683; 30/321, 322; 294/61

[56] References Cited

U.S. PATENT DOCUMENTS

| | | | |
|---|---|---|---|
| 839,236 | 12/1906 | Vartanian | 99/421 HV |
| 2,315,143 | 3/1943 | Thompson | 99/421 A |
| 2,324,233 | 7/1943 | Parsons | 99/421 P |
| 2,485,890 | 10/1949 | Keljik | 99/421 HV |
| 2,827,848 | 3/1958 | Alden | 99/421 |
| 3,943,837 | 3/1976 | Trkla | 99/421 H |
| 4,176,592 | 12/1979 | Doyle, Jr. | 99/419 |
| 4,214,516 | 7/1980 | Friedl et al. | 99/421 P |
| 4,539,751 | 9/1985 | Chan | 99/421 A |
| 4,815,367 | 3/1989 | Hanson et al. | 99/421 H |
| 4,857,031 | 8/1989 | Lucas | 99/419 |

FOREIGN PATENT DOCUMENTS 2515658 10/1976 Fed. Rep. of Germany ... 99/421 V

Primary Examiner—Timothy F. Simone
Attorney, Agent, or Firm—Charles W. Chandler

[57] ABSTRACT

A manually-manipulatable device for supporting and rotating a number of hot dogs above the surface of a grille during a cooking operation. The device is equipped with balancer elements that maintain the device in a stabilized condition on the grilled surface in spite of cantilever forces imposed by the supported hot dogs. An elongated handle is rotatably attached to a housing that mounts a number of rotary hot dog grippers. A gear mechanism within the housing transmits a drive force from the handle to the hot dog grippers.

12 Claims, 1 Drawing Sheet

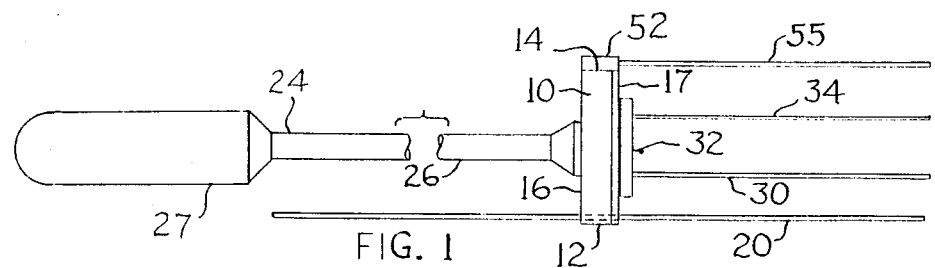
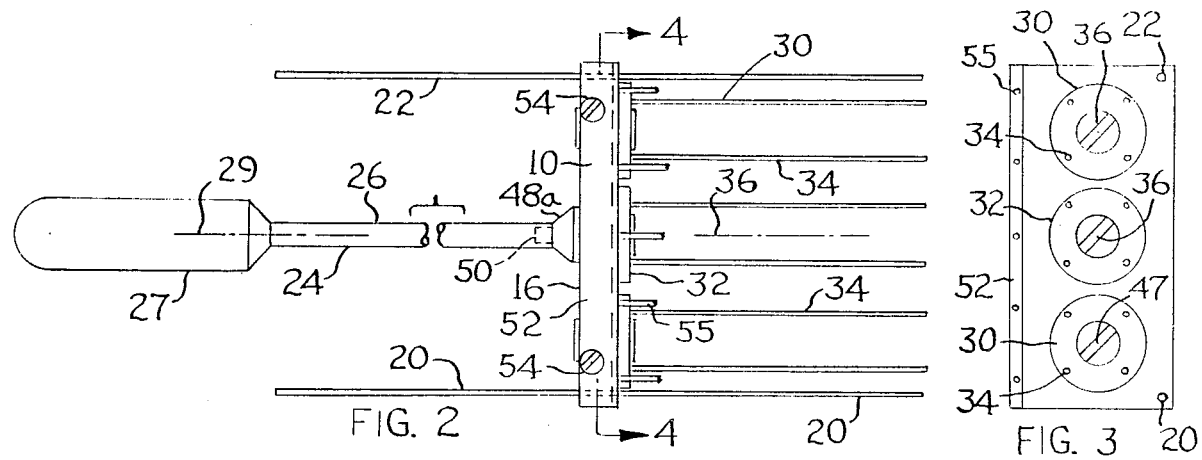
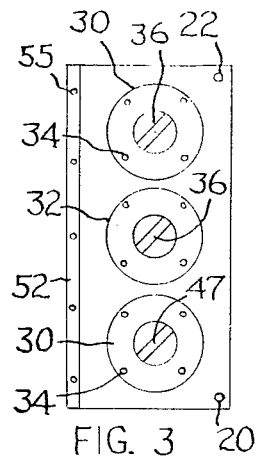
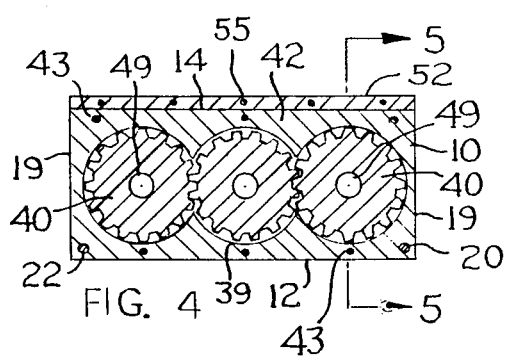
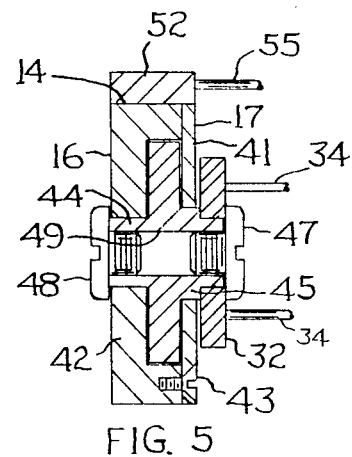

HOT DOG ROASTER

BACKGROUND AND SUMMARY OF THE INVENTION

This invention relates to a device for supporting hot dogs (frankfurters) above a grille surface during a cooking operation. The device comprises a handle that can be rotated to rotate the hot dogs so that the entire side surface of each hot dog is subjected to the heating action of the charcoal in the grille. The handle can be manually rotated on a continuous basis. Alternately, the handle can be rotated intermittently to allow the cooking operation to proceed while the hot dog is held in different selected positions of rotary adjustment.

In the preferred practice of the invention, the device supports three or five hot dogs in horizontal positions above a grille surface. A single elongated handle is driveably connected to each hot dog support element, such that manual rotation of the single handle causes each hot dog to be rotated around a support axis. As an added feature, the device may include a rack for supporting hot dog buns directly above the hot dogs. Heat from the grille warms the buns while the hot dogs are being cooked.

U.S. Pat. No. 2,827,848 to B. S. Alden shows a rotary fork structure that is in some respects similar to the device of the present invention. The Alden patented device includes a small battery-operated motor located within a handle structure for rotating a drive shaft that extends through an elongated tubular support. The drive shaft has gear connections to a pair of tines that are adapted to extend through foodstuffs to be cooked on a grille.

The rotary fork structure shown in the Alden patent is intended to be used over a fire, with the handle portion of the fork structure being grasped by the hand of the user. The fork structure is not self-supporting. The user is required to manually hold the fork structure during the cooking operation. It is not possible to set the fork structure down on a grille and leave it unattended during the cooking operation. The present invention contemplates a hand-manipulatable device that includes a flat-surfaced housing adapted to be supported in an upright position on a grille surface during a cooking operation. Two rod-like balancer elements extend in opposite directions from the housing to maintain the housing in an upright position on a grille surface. The device can be left unattended during the cooking operation.

My contemplated device includes an elongated rotary handle extending from the housing in one direction. Three or more hot dog grippers extend from the housing in an opposite direction. The arrangement is such that when the housing is positioned on the grille surface, the hot dogs are located over the coals in the grille. The elongated handle is located outwardly beyond the side edge of the grille where it can be manually grasped to shift the device along the grille, e.g., to a point where the hot dogs are in an optimum heating position relative to the hot coals. The handle has internal drive connections to the hot dog grippers, such that manual rotation of the handle causes all of the supported hot dogs to be rotated for presentation of different side areas of the hot dogs to the hot coals.

The device of the present invention can be used with any conventional grille. The device is completely separate from the grille and requires no hardware for its use on a grille.

THE DRAWINGS

FIG. 1 is a side elevational view of a hot dog support device embodying the invention.

FIG. 2 is a top plan view of the device shown in FIG. 1.

FIG. 3 is a right end view of the device shown in FIG. 2.

FIG. 4 is a sectional view taken on line 4—4 in FIG. 2.

FIG. 5 is an enlarged sectional view taken on line 5—5 in FIG. 4.

DESCRIPTION OF A PREFERRED EMBODIMENT OF THE INVENTION

The drawings show a hand manipulatable device adapted to support three hot dogs above a grille surface, not shown. The device comprises a rectangular housing 10 having a lower flat edge 12, an upper edge 14, and two major faces 16 and 17. As seen in FIG. 4, the housing has two side edges 19. The housing is adapted to be positioned with edge 12 seated on a grille surface, and with major faces 16 and 17 extending vertically. Two balancer rods 20 and 22 extend through the housing near its lower edge 12 to prevent tipover of the housing. As seen in FIG. 2, the two balancer rods are widely spaced to provide a wide-stance support for the housing. Each balancer rod is preferably relatively long, e.g., about nine inches in length. Housing 10 has a thickness on the order of one-half inch, such that rods 20 and 22 project slightly more than four inches from each major face of the housing.

An elongated rotary handle 24 extends leftwardly from face 16 of housing 10. The length of the handle is not critical. Typically the handle has a length of about fifteen inches. The handle can include a tubular metal section 26 and an elongated wooden hand grip section 27. With housing 10 supported in an upright position on a grille surface, handle 24 can be rotated around its longitudinal axis 29. Housing 10 acts as an anchoring means against the grille surface while a manual rotary turning force is applied to hand grip section 27 of the handle.

Handle 24 is rotatably (driveably) connected to three similarly-constructed hot dog grippers 30. Each gripper 30 comprises a circular disk 32 and four substantially straight stiff wire elements 34 extending rightwardly from the disk. Each disk 32 is rotatably mounted on housing 10 for rotation around its central axis 36. The four associated wire elements 34 are arranged equidistant from central axis 36 to define a central space for receiving a hot dog, not shown. The hot dog is inserted into the space circumscribed by the four wire elements 34, such that the wire elements resiliently grip side surface areas of the hot dog.

Wire elements 34 are preferably about four inches long. Each wire element has a diameter of about 0.05 inch. As seen in FIG. 3, the four wire elements are arranged in a square pattern centered on disk rotational axis 36. The wire elements are located on an imaginary circle having a diameter of approximately one inch at the points where the wire elements emerge from the associated disk 32. As the wire elements proceed away from disk 32, they converge slightly toward disk rotational axis 36. At their right ends, the wire elements have a diametrical spacing of about seven-eighth inch.

The slight convergence of the wire elements is helpful in enabling the wire elements to grip a range of different diameter hot dogs. Individual wire elements can be manually forced away from the disk central axis to accommodate larger diameter hot dogs. The convergence of the wire elements enables such elements to grip the smaller diameter hot dogs.

FIGS. 4 and 5 illustrate a gear mechanism for transmitting a rotary drive force from the handle 24 to two of the three disks 32. The other disk is attached directly to the handle. The gear mechanism comprises a central drive gear 39 attached directly to handle 24 within housing 10. Two additional gears 40 are arranged in a row on either side of gear 39. The three gears 39, 40 and 40 are in meshed engagement, such that manual rotation of handle 24 causes all three gears to rotate. The gears have the same diameter so that each gear rotates at the same speed.

Housing 10 comprises a main rectangular block element 42 having circular cavities therein for containment of the three gears 39, 40, 40. A flat plate 41 extends across the right face of block element 42 (FIG. 1) to enclose the three gears. Screws 43 may be used to secure plate 41 to block element 42.

FIG. 5 shows a representative structural arrangement for rotatably mounting a gear 40 within housing 10. A similar structural arrangement is used to mount the other gear 40 and central gear 39. As shown in FIG. 5, the gear has two stub shafts 44 and 45 extending therefrom through aligned circular openings in block element 42 and closure plate 41. A reduced diameter section of stub shaft 45 accommodates a disk 32 thereon. Screws 47 and 48 are threaded into opposite ends of an axial hole 49 that extends through the screw on the screw axis. Screws 47 and 48 act as clamps to affix disk 32 to the associated screw, and to minimize end play of the stub shafts.

Each gear 39 or 40 is floatably mounted for rotary motion around its axis. In the case of central gear 39, the associated screw 48a (FIG. 2) has a threaded extension 50 that screws into a threaded hole in the tubular portion of handle 24, such that the handle is rigidly attached to gear 39. Various different structural arrangements could be used to affix handle 24 to gear 39.

In the use of the illustrated apparatus, housing 10 can be positioned with its lower flat edge 12 resting on the surface of an outdoor cooking grille containing burning charcoal or other heat source. Hot dogs are inserted into the three grippers 30 such that each hot dog is oriented horizontally a short distance above the grille surface, e.g., about one-half inch. Handle 24 extends from housing 10 beyond the outer side edge of the grille. Accordingly, the handle will be in a relatively cool condition such that it can be manually grasped for shifting housing 10 to an optimal position for the charcoal to heat the hot dogs. Balancer rods 20 and 22 stabilize housing 10 against possible tipover due to the weight of the hot dogs or handle 24.

Handle 24 can be rotated around its longitudinal axis 29 to rotate the hot dogs around the disk rotational axis 36. It, thus, becomes possible to cook the entire surface of each hot dog (by suitably rotating handle 24). The illustrated device is self-supporting on the grille surface, such that the device can be left unattended. It is unnecessary to continually hold handle 24 or otherwise manually support the device. The device can be used with any conventional grille.

In order to make the device somewhat more universal, it can be equipped with a rack for supporting hot dog buns in the space above the hot dogs. The bun-support rack comprises a rectangular bar 52 secured to the upper edge of housing 10 by screws 54 (FIG. 2). Five rods 55 extend horizontally in cantilever fashion from bar 52 in the space directly above the hot dogs being heated. Heated air passes upwardly around the buns resting on rods 55 to maintain the buns in a warm condition while the hot dogs are being cooked.

The illustrated device is a relatively simple low cost device for supporting and rotating a number of hot dogs above a grille surface. The drawings show a device for accommodating three hot dogs. However, the device can be modified to support and rotate a greater number of hot dogs, e.g., five hot dogs.

The device is extended primarily for use with hot dogs. However, it could be used with other foodstuffs, e.g., corn-on-the-cob or marshmallows.

Having described my invention, I claim:

1. A hand-manipulatable device for supporting hot dogs above a grille surface, comprising a housing having:

an upper edge, a lower edge, and two upright major faces, said housing being adapted to have its lower edge rest on a grille surface;

two elongated balancer elements extending from said housing normal to said major faces;

each balancer element projecting in opposite directions from the housing near its lower edge;

said balancer elements being spaced so that when the housing is positioned with its lower edge on a grille surface, the balancer elements will contact the grille surface at widely-spaced points to thereby maintain the housing in an upright position;

an elongated rotary handle projecting from one of the housing major faces; said handle extending generally horizontally when the housing is positioned on a grille surface, whereby the handle can be rotated around its axis without disturbing the housing;

a plural number of rotary hot dog grippers projecting from the other major face of the housing;

each hot dog gripper being adapted to hold a hot dog in a generally horizontal position a slight distance above a grille surface when the housing is in an upright position on the grille surface;

each hot dog gripper being mounted on the housing for rotation around a horizontal axis extending normal to said other major face of the housing;

each hot dog gripper being adapted to hold the associated hot dog in axial alignment with its rotational axis so that rotation of the gripper causes different side areas of the hot dog to be presented to the grille surface without changing the spacing of the hot dog from the grille surface; and, means within the housing for driveably connecting the rotary handle to each hot dog gripper, whereby manual rotation of the handle causes each hot dog gripper to rotate.

2. The device of claim 1 wherein each said balancer element comprises a rod extending through the housing normal to the housing major faces.

3. The device of claim 2, wherein each balancer rod is at least six inches long.

4. The device of claim 1, wherein each hot dog gripper comprises a rotary disk located near said other major face of the housing and a plural number of straight stiff wire elements extending from said disk, said wire elements being arranged equidistant from the disk rotational axis to circumscribe a space for receiving a hot dog.

5. The device of claim 4 wherein said wire elements are convergent in directions leading away from the associated disk, whereby said wire elements can be spread apart variable amounts for gripment of varying diameter hot dogs.

6. The device of claim 5, wherein each hot dog gripper comprises four wire elements arranged in a square pattern centered on the disk rotational axis.

7. The device of claim 1, wherein said drive means comprises a first drive gear carried by said handle within the housing, and a driven gear carried by each hot dog gripper within the housing, said gears being in meshed engagement.

8. The device of claim 7, wherein there are three hot dog grippers, one of said grippers being axially aligned with the elongated handle, the other two grippers being arranged on either side of said one gripper in a row arrangement.

9. The device of claim 8, wherein the rotational axis of the three hot dog grippers are located in an imaginary plane extending parallel to the lower edge of the housing, so that when the housing is resting upright on a grille surface, each hot dog gripper is spaced the same distance from the grille surface.

10. The device of claim 1, and further comprising a bun-support rack mounted on the upper edge of the housing, said rack extending from the housing directly above the hot dog grippers whereby heated air from the grille passes around buns supported on the rack.

11. The device of claim 1, wherein said bun-support rack comprises a bar seated flatwise on the upper edge of the housing, and a plural number of rods extending from said bar normal to the planes of the housing major faces.

12. A hand-manipulatable device for supporting hot dogs above a grille surface, comprising
a housing adapted to assume an upright position on a grille surface;
an elongated rotary handle projecting from said housing;
said handle being adapted to assume a horizontal position when the housing is positioned on a grille surface so that the handle can be rotated around its longitudinal axis without disturbing the housing;
a plural number of rotary hot dog grippers projecting from the housing directly away from the handle;
each hot dog gripper being adapted to hold a single hot dog in a generally horizontal position a slight distance above a grille surface when the housing is positioned on the grille surface;
each gripper being adapted to hold the associated hot dog in alignment with the gripper rotational axis so that the rotation of the gripper causes different side areas of the hot dog to be presented to the grille surface without changing the spacing of the hot dog from the grille surface;
means within the housing for driveably connecting the rotary handle to each hot dog gripper, whereby manual rotation of the handle causes all of the hot dog grippers to rotate in unison; and
a bun-support rack mounted in cantilever fashion on said housing so that the rack is located directly above the hot dog gripper when the housing is in an upright position on a grille surface.

* * * * *